A. COX.

Sheet-Metal Pan.

No. 9,250. Reissued June 15, 1880.

WITNESSES

B. M. Williams

John H. Robertson

INVENTOR

Allan Cox

By his Atty.

Henry W. Williams

UNITED STATES PATENT OFFICE.

ALLAN COX, OF BOSTON, MASSACHUSETTS.

SHEET-METAL PAN.

SPECIFICATION forming part of Reissued Letters Patent No. 9,250, dated June 15, 1880.

Original No. 224,396, dated February 10, 1880. Application for reissue filed May 1, 1880.

*To all whom it may concern:*

Be it known that I, ALLAN COX, of Boston, in the county of Suffolk and State of Massachusetts, have invented a new and Improved Sheet-Metal Pan, of which the following is a specification.

Figure 1:
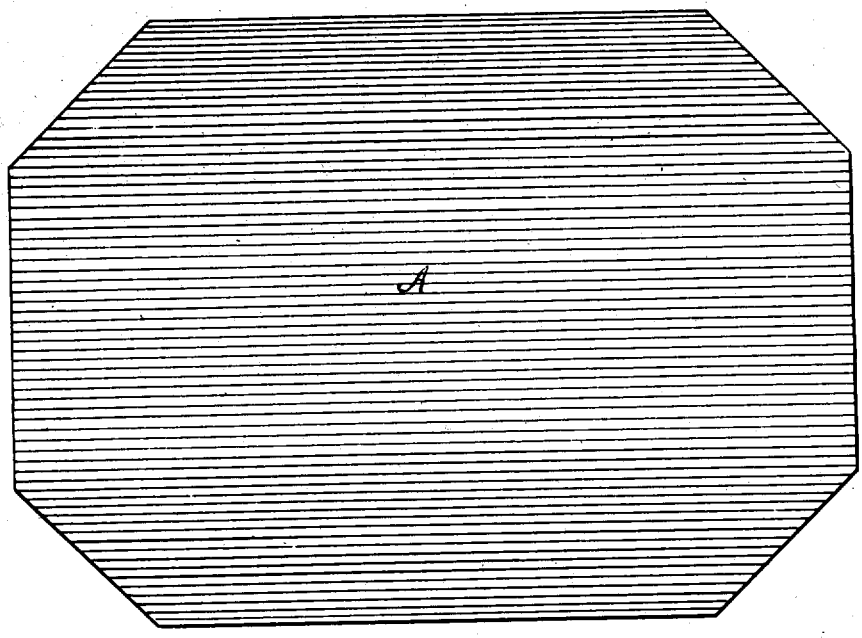
Figure 2:
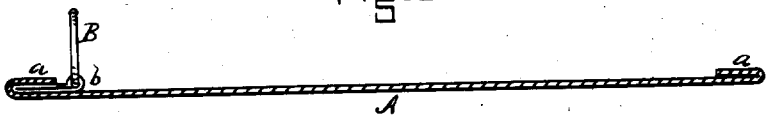
Figure 3:
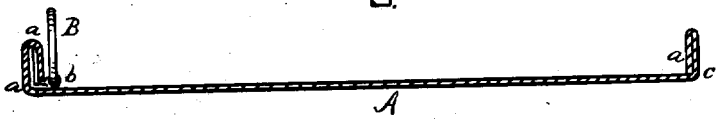
Figure 5:
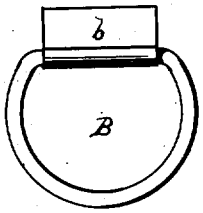
Figure 6:
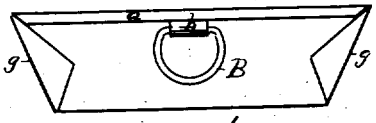
Figure 4:
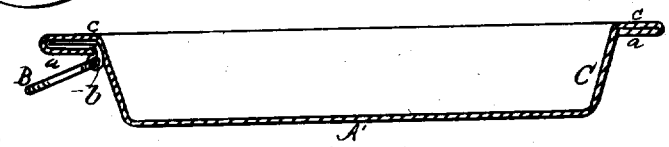

Figure 1 is a plan view, representing a sheet of metal cut in proper shape for the construction of the pan. Fig. 2 is a longitudinal sectional view, representing the second step in the construction of the pan, wherein the edges of the plate are once folded over and the ring is put into position. Fig. 3 is a longitudinal sectional view, representing the third step in the construction, wherein the edges of the plate are still further folded over. Fig. 4 is a longitudinal sectional elevation of a completed pan. Fig. 5 is a plan of the ring and its ear. Fig. 6 is an end elevation of the pan.

The invention consists in a sheet-metal pan with flat bottom, flat folded edges, a ring, and an ear, as hereinafter described.

In the drawings, A represents the octagonal blank or sheet of metal. (Shown flat in Fig. 1.) In Fig. 2 the edges *a* of the sheet A are shown folded over upon the surface of the said sheet, and the ring B is shown attached to the said sheet A by means of the insertion of the ear *b* under a fold, *a*. In Fig. 3 it is shown that another bend, *c*, is made in the edge of the completed part.

In Fig. 4 the completed pan is represented, in which A′ is the bottom; C, the sides; *a*, the folded edge; *c*, the inner bend of the edge; B, the ring, and *b* the ear holding the said ring B to the pan. It is found that this folded edge *c* is stiffer than the ordinary wired pan-edges are and is much cheaper of construction, and it is also found that the ring B is securely held to the pan by the binding or folding of the ear *b* in the folded edge *c*.

In Fig. 6 the corners *g* are shown. They impart strength and stiffness to the pan.

The corners are first cut from the sheet of metal to form the blank A; next, the edges of the blank are folded over, and the ear *b*, with the ring B, is inserted under one of the folds; thirdly, the folded edges are turned up at right angles to the body of the blank, so as to bend the ear *b* in the fold; fourthly, the sheet is reversed and struck up with a die or other device into the form shown in Fig. 4 of the drawings; lastly, the corners *g* are folded down, as shown in Fig. 6.

This pan, then, thus constructed without rivets, wire, or solder, and having its ring secured to it without the use of rivet or solder, has edges as strong and as durable as the ordinary wire-edged pan, is of somewhat less weight, is more convenient in use, because its broad flat edges afford a good hold in putting it in or out of an oven, and can be manufactured at a greatly reduced cost of material, time, and labor.

Having thus fully described my invention, what I claim, and desire to secure by Letters Patent, is—

1. As an improved article of manufacture, the sheet-metal pan herein described, having a flat bottom, flat folded edges *a*, and folded corners *g*, substantially as set forth.

2. The herein-described sheet-metal pan, having a flat bottom, flat folded edges *a*, folded corners *g*, and provided with the ring and ear B *b*, applied as specified, all substantially as set forth.

ALLAN COX.

Witnesses:
HENRY W. WILLIAMS,
B. W. WILLIAMS.